US006950284B1

(12) United States Patent
Lin

(10) Patent No.: US 6,950,284 B1
(45) Date of Patent: Sep. 27, 2005

(54) CLEATING FEATURES TO IMPROVE ADHESIVE INTERFACE BETWEEN AN ACTUATOR TANG AND A TANG-SUPPORTING SURFACE OF AN ACTUATOR ASSEMBLY OF A HARD DISK DRIVE

(75) Inventor: Chen-Chi Lin, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 223 days.

(21) Appl. No.: 10/377,037

(22) Filed: Feb. 28, 2003

(51) Int. Cl.[7] .......................... G11B 21/22; G11B 5/55
(52) U.S. Cl. ................................ 360/265.7; 360/256.2
(58) Field of Search .......................... 360/235.7, 256.2, 360/265.8, 264.1, 264, 260, 240

(56) References Cited

U.S. PATENT DOCUMENTS 5,729,405 A * 3/1998 Isomura et al. .......... 360/256.2
5,808,835 A * 9/1998 Fujiwara .................. 360/244.7
6,172,856 B1 * 1/2001 Jang ........................ 360/256.2
6,487,052 B1 * 11/2002 Macpherson et al. .... 360/256.2
6,683,756 B1 * 1/2004 Zhao et al. .............. 360/265.8

* cited by examiner

*Primary Examiner*—Julie Anne Watko
(74) *Attorney, Agent, or Firm*—Alan W. Young, Esq.

(57) ABSTRACT

A disk drive includes a disk, a latch assembly including a magnet and a head stack assembly for reading and writing to the disk. The head stack assembly includes a body portion defining a through bore that defines a pivot axis; an actuator arm cantilevered from the body portion; a head gimbal assembly coupled to the actuator arm; a coil portion cantilevered from the body portion in an opposite direction from the actuator arm, the coil portion defining first and second actuator fork members, one of the first and second actuator fork members defining a tang-supporting surface, the tang-supporting surface defining at least one cleating feature configured to increase a surface area of the tang-supporting surface, and a tang configured to interact with the magnet, the tang being attached to the tang-supporting surface by a layer of adhesive disposed on the tang-supporting surface.

24 Claims, 6 Drawing Sheets

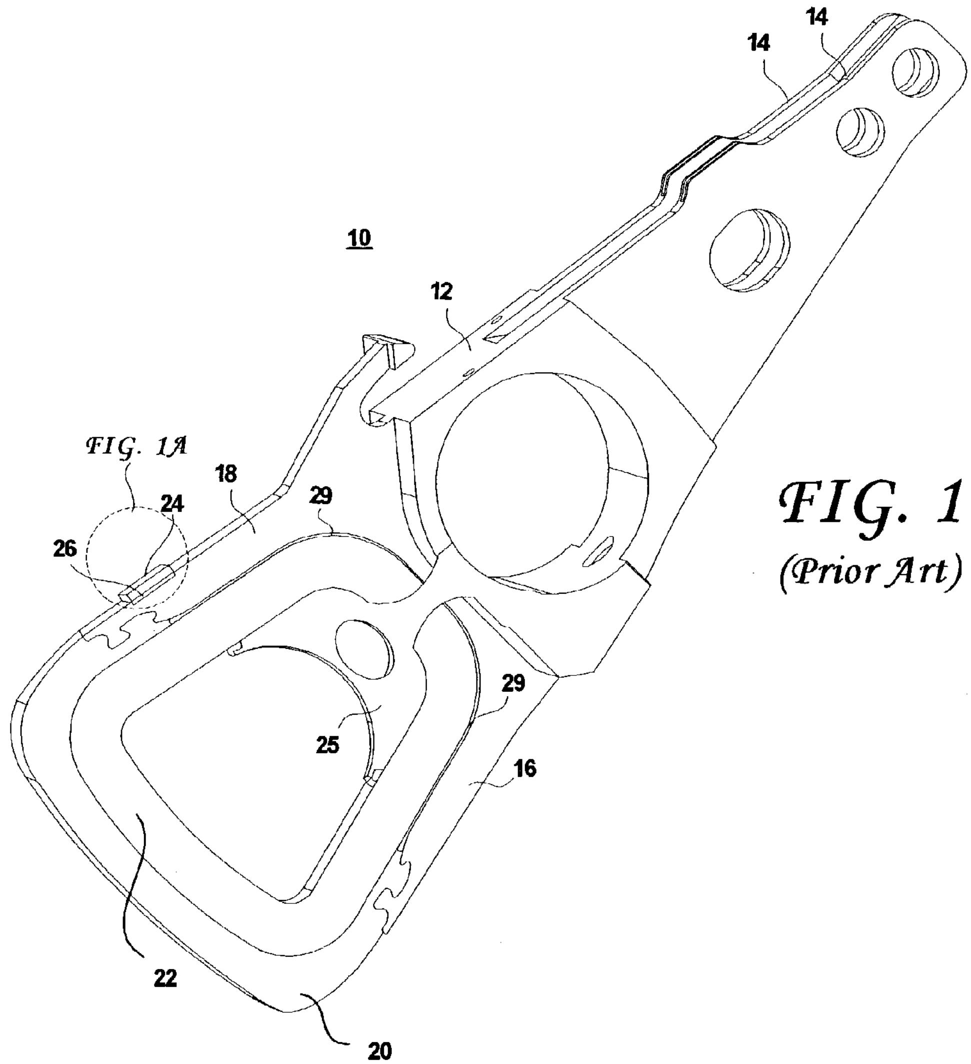
FIG. 1
(Prior Art)
FIG. 1A
(Prior Art)
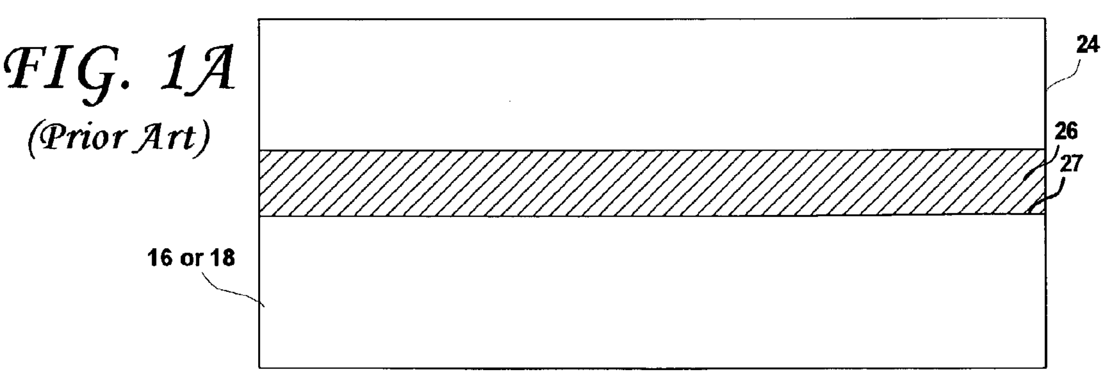

CLEATING FEATURES TO IMPROVE ADHESIVE INTERFACE BETWEEN AN ACTUATOR TANG AND A TANG-SUPPORTING SURFACE OF AN ACTUATOR ASSEMBLY OF A HARD DISK DRIVE

BACKGROUND OF THE INVENTION

1. Field of the Invention

This invention relates to magnetic disk drives. In particular, embodiments of the present invention relate to disk drives, head stack assemblies and actuator arm assemblies that include a tang supporting surface that includes one or more cleating features that increase the surface area thereof.

2. Description of the Prior Art and Related Information

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a slider with at least one transducer or read/write element for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the slider toward the disk; and (3) a flex cable assembly that provides an electrical interconnect with minimal constraint on movement.

FIG. 1 shows an example of a conventional actuator assembly 10. As shown therein, the conventional actuator assembly 10 includes a body portion 12 from which are cantilevered one or more actuator arms 14. Also cantilevered from the actuator body portion 12 is a coil portion that includes first and second actuator fork members 16 and 18. The actuator fork members 16 and 18 support the wound coil 22 that forms a portion of actuator coil portion. The wound coil 22 is also at least partially encased by a plastic overmold 20, which serves to further support and add rigidity to the coil 22 and actuator assembly 10. As shown, the actuator assembly 10 may also include a bobbin 25 that is secured to the wound coil 22 by an adhesive and that increases the rigidity of the coil 22 and that of the actuator assembly 10.

A typical HGA includes a load beam, a gimbal attached to an end of the load beam, and a slider attached to the gimbal. The load beam has a spring function that provides a "gram load" biasing force and a hinge function that permits the slider to follow the surface contour of the spinning disk. The load beam has an actuator end that connects to the actuator arm and a gimbal end that connects to the gimbal that supports the slider and transmits the gram load biasing force to the slider to "load" the slider against the disk. A rapidly spinning disk develops a laminar airflow above its surface that lifts the slider away from the disk in opposition to the gram load biasing force. The slider is said to be "flying" over the disk when in this state.

Understandably, such drives may be relatively sensitive to shocks occasioned by mishandling, excessive vibrations, drops and other events causing a rapid acceleration of the disk drive. Indeed, should the head crash into a spinning disk because of a rotational shock, for example, the high stiction (a contraction of the phrase "static friction") of the disk may prevent the disk from spinning and developing the laminar airflow necessary for the head to lift away from the disk. This problem is particularly acute when the disk includes an outermost layer of glass. As the glass surface is highly polished, there is then a great amount of contact surface area between the head and the disk, increasing the friction therebetween. Should the head contact the disk, it may then literally stick thereto, potentially ruining the entire drive.

In an effort to mitigate the effects of such shocks (e.g., rapid accelerations), a number of latches have been developed to latch the HSA and prevent the head(s) from contacting the disk(s). The operative mechanism of such latches may be mechanical, electromechanical or magnetic in nature. The first function of a latch is typically to limit the travel of the HSA both toward the inner diameter (hereafter "ID") and toward the outer diameter of the disk. The second function typically discharged by such latches is to prevent the heads of the HSA from leaving the ramp load (if a ramp load is present) or a landing zone on the disk (if a landing zone is present around, for example, the ID of the disk) during shock events that might otherwise jolt the heads from the ramp or landing zone and onto the data-carrying portion of the disk during non-operative conditions of the drive.

Electromechanical and magnetic latches conventionally rely on a metallic tang or similar structure (shown at reference numeral 24 in FIG. 1) protruding from the overmolded voice coil portion or attached to an actuator fork member of the HSA. Either a permanent magnet or an electromagnet is then typically used to attract the tang 24 and to latch the HSA when the drive is not in operation. To ensure that adequate shock protection (especially in small form factor drives suitable for mobile computing applications), the latching force (the force with which the latch holds the tang to the permanent or electro-magnet) must be great. In the case of a permanent magnet, however, a high magnitude latching force requires a correspondingly great de-latching force to free the tang from the attractive force of the magnet. Such de-latching force is typically achieved by so-called resonance de-latching, wherein alternating current is applied to the voice coil portion of the HSA at a predetermined resonant frequency to cause the HSA to break free of the attractive force of the permanent magnet. The stronger the magnet, however, the greater the current is necessary to de-latch the HSA when the drive is called into active operation. Such high latching and de-latching forces place a great strain on the interface between the surface of the actuator assembly that supports the tang and the tang. FIG. 1A shows a top view of the tang and the tang 24 and the tang supporting surface (which may be a portion of the fork member 16 or 18). As shown, the tang-supporting surface 27 conventionally is smooth and flat over its entire surface. Between the tang 24 and the tang-supporting surface 27 is a layer of adhesive 26. The structure of such interfaces is not believed to be optimal in view of the large latching and de-latching forces occurring in the latch assemblies of conventional disk drives. From the foregoing, therefore, it may be appreciated that strengthening the bond between the tang-supporting surface of the actuator assembly and the tang is desirable.

SUMMARY OF THE INVENTION

An embodiment of the present invention may be regarded as a disk drive, comprising a disk; a latch assembly including a magnet and a head stack assembly for reading and writing to the disk. The head stack assembly may include a body portion defining a through bore that defines a pivot axis; an actuator arm cantilevered from the body portion; a head gimbal assembly coupled to the actuator arm; a coil portion cantilevered from the body portion in an opposite direction from the actuator arm, the coil portion defining first and second actuator fork members, one of the first and second actuator fork members defining a tang-supporting surface, the tang-supporting surface defining at least one cleating feature configured to increase a surface area of the tang-supporting surface, and a tang configured to interact with the magnet, the tang being attached to the tang-supporting surface by a layer of adhesive disposed on the tang-supporting surface.

One or more of the cleating features may define a through bore configured to allow the layer of adhesive to flow therethrough. The through bore may defines a through bore axis that is substantially parallel to the pivot axis or may define a through bore axis that is substantially perpendicular to the pivot axis, other orientations being possible. One or more of the cleating features may define a nonzero elevation toward the tang. Alternatively or in addition, one or more of the cleating features may define a nonzero recess away from the tang.

According to further embodiments thereof, the present invention may also be regarded as a head stack assembly for reading and writing to a disk of a disk drive, the disk drive including a latch assembly that includes a magnet, the head stack assembly comprising a body portion defining a through bore that defines a pivot axis; an actuator arm cantilevered from the body portion; a head gimbal assembly coupled to the actuator arm; a coil portion cantilevered from the body portion in an opposite direction from the actuator arm, the coil portion defining first and second actuator fork members, one of the first and second actuator fork members defining a tang-supporting surface, the tang-supporting surface defining at least one cleating feature configured to increase a surface area of the tang-supporting surface, and a tang configured to interact with the magnet, the tang being attached to the tang-supporting surface by a layer of adhesive disposed on the tang-supporting surface.

One or more of the cleating features may define a through bore configured to allow the layer of adhesive to flow therethrough and/or may define a through bore axis that is substantially parallel to the pivot axis or may define a through bore axis that is substantially perpendicular to the pivot axis, other orientations being possible. One or more of the cleating features may define a nonzero elevation toward the tang and/or may define nonzero recess away from the tang.

Other embodiments of the present invention may also be viewed as an actuator assembly for a disk drive, the disk drive having a latch assembly that includes a magnet, the actuator assembly comprising a body portion defining a through bore that defines a pivot axis; an actuator arm cantilevered from the body portion; a coil portion cantilevered from the body portion in an opposite direction from the actuator arm, the coil portion defining first and second actuator fork members, one of the first and second actuator fork members defining a tang-supporting surface, the tang-supporting surface defining at least one cleating feature configured to increase a surface area of the tang-supporting surface, and a tang configured to interact with the magnet, the tang being attached to the tang-supporting surface by a layer of adhesive disposed on the tang-supporting surface. One or more of the cleating features may define a through bore configured to allow the layer of adhesive to flow therethrough, which through bore may define a through bore axis that is substantially parallel to the pivot axis, substantially perpendicular to the pivot axis, other orientations being possible. One or more of the cleating features may define a nonzero elevation toward the tang and/or a nonzero recess away from the tang.

According to another embodiment, the present invention is an actuator assembly for a disk drive, the disk drive having a latch assembly that includes a magnet, the actuator assembly comprising: a body portion defining a through bore that defines a pivot axis; an actuator arm cantilevered from the body portion; a coil portion cantilevered from the body portion in an opposite direction from the actuator arm, the coil portion defining first and second actuator fork members, one of the first and second actuator fork members defining a tang-supporting surface, and a tang configured to interact with the magnet, the tang defining an actuator fork member attaching surface, the actuator fork member attaching surface defining at least one cleating feature configured to increase a surface area of the actuator fork member attaching surface, the actuator fork member attaching surface being attached to the tang-supporting surface by a layer of adhesive.

One or more of the cleating features may define a through bore configured to allow the layer of adhesive to flow therethrough. The through bore may define a through bore axis that is substantially parallel to the pivot axis, is substantially perpendicular to the pivot axis or is otherwise oriented. One or more of the cleating feature may define a local extrusion. Alternatively or in addition, one or more of the cleating feature may define a local recess.

BRIEF DESCRIPTION OF THE DRAWINGS

FIG. 1 shows a bottom perspective view of a conventional actuator assembly.

FIG. 1A is a top view of the adhesive interface between the tang-supporting surface and the tang in the conventional actuator assembly of FIG. 1.

DESCRIPTION OF PREFERRED EMBODIMENTS

Figure 2:
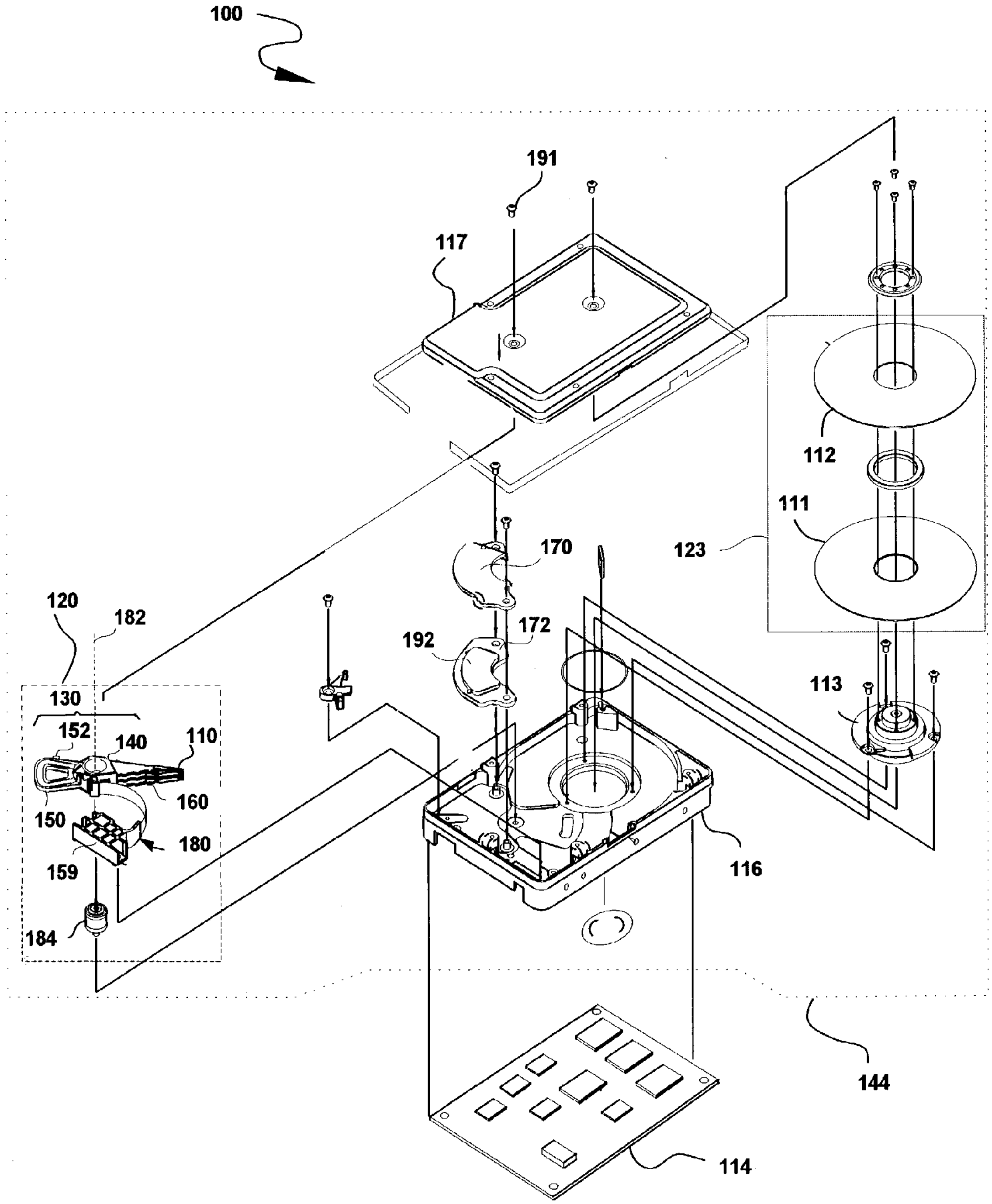
FIG. 2 is an exploded view of a disk drive according to an embodiment of the present invention.

FIG. 2 shows the principal components of a magnetic disk drive 100 constructed in accordance with the present invention. With reference to FIG. 2, the disk drive 100 comprises a head disk assembly (HDA) 144 and a printed circuit board assembly (PCBA) 114. The HDA 144 includes a base 116 and a cover 117 attached to the base 116 that collectively house a disk stack 123 that includes a single magnetic disk or a plurality of magnetic disks (of which only a first disk 111 and a second disk 112 are shown), a spindle motor 113 attached to the base 116 for rotating the disk stack 123, a head stack assembly (HSA) 120, and a pivot bearing cartridge 184 that rotatably supports the HSA 120 on the base 116. The spindle motor 113 rotates the disk stack 123 at a constant angular velocity. The HSA 120 comprises a swing-type or rotary actuator assembly 130, at least one head gimbal assembly (HGA) 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160 and supported by first and second actuator fork members, best shown in FIG. 3 at 304, 306. The coil portion 150 also includes a tang 152 configured to interact with a magnet of a latch assembly, as disclosed below in detail relative to FIGS. 4–11. The actuator arm(s) 160 supports the HGA 110 that, in turn, supports slider(s) (not shown) for reading and writing to the disk(s) 111, 112. The flex cable assembly 180 may include a flex circuit cable and a flex bracket 159. The HSA 120 is pivotally secured to the base 116 via the pivot-bearing cartridge 184 so that the slider at the distal end of the HGA 110 may be moved over the surfaces of the disks 111, 112. The pivot-bearing cartridge 184 enables the HSA 120 to pivot about a pivot axis, shown in FIGS. 2, 3 at reference numeral 182. The storage capacity of the HDA 144 may be increased by, for example, increasing the track density on the disks 111, 112 and/or by including additional disks in the disk stack 123 and by an HSA 120 having a vertical stack of HGAs 110 supported by multiple actuator arms 160.

The "rotary" or "swing-type" actuator assembly comprises a body portion 140 that rotates on the pivot bearing 184 cartridge between limited positions, a coil portion 150 that extends from one side of the body portion 140 to interact with one or more permanent magnets 192 mounted to back irons 170, 172 to form a voice coil motor (VCM), and an actuator arm 160 that extends from an opposite side of the body portion 140 to support the HGA 110. The VCM causes the HSA 120 to pivot about the actuator pivot axis 182 to cause the slider and the read write transducers thereof to sweep radially over the disk(s) 111, 112.

Figure 3:
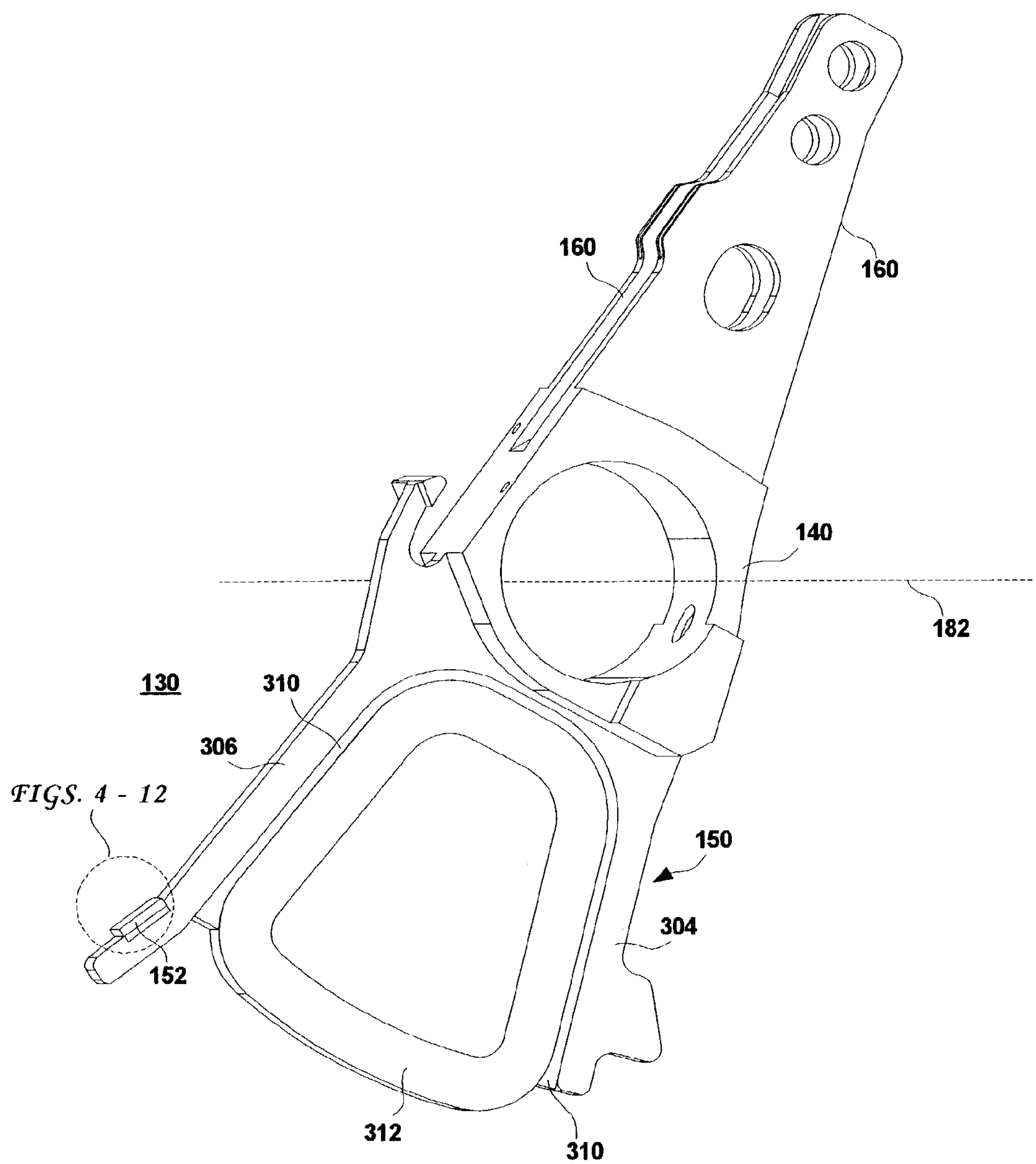
FIG. 3 shows an actuator assembly according to an embodiment of the present invention.

FIG. 3 shows an actuator assembly 130 according to an embodiment of the present invention. As shown therein, the actuator assembly 130 includes a body portion 140 from which one or more actuator arms 160 are cantilevered. Cantilevered from the body portion in the opposite direction from the actuator arms 160 is a coil portion 150 that includes first and second actuator fork members 304, 306 that together support a coil 312. The coil 312 may be attached to the first and second actuator fork members 304, 306 by means of, for example, a layer of adhesive material 310. One of the first and second actuator fork members 304, 306 may include a tang 152 to interact with a magnetic latch assembly, as disclosed in detail below.

Figure 4:
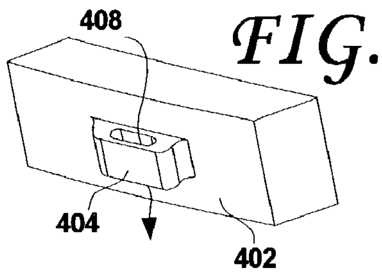
FIG. 4 is a view of a tang-supporting surface of an actuator assembly according to an embodiment of the present invention.

Within the context of the present invention, the phrase "tang-supporting surface" refers to the surface 402 of one of the actuator fork members 304, 306. More generally still, the phrase "tang-supporting surface" may also refer to whatever surface of the actuator assembly 130 to which the tang 152 is attached. According to embodiments of the present invention, the tang-supporting surface (shown at 402 in FIGS. 4–11) defines one or more cleating features (shown at 404 in FIGS. 4–8) that is/are configured to increase the surface area of the tang-supporting surface 402. Alternatively or in addition, as shown in FIG. 12, the tang 152 may define an actuator fork member attaching surface 1202 that defines one or more cleating features. The cleating features 404 in FIGS. 4–8 may have any shape that increases the surface area of the tang-supporting surface 402. For example, one or more of the cleating features 404 may define an extrusion relative to the tang-supporting surface 402. Alternatively or in combination with the foregoing, one or more of the cleating features 404 may define a recess relative to the tang-supporting surface 402. The embodiment of FIG. 4 is one in which the cleating features 404 define an extrusion relative to the tang-supporting surface 402. The increase in surface area afforded by the cleating feature or features 404 enables the adhesive that secures the tang 152 to the tang-supporting surface 402 to be disposed over a larger area than would be the case in the absence of such cleating feature or features 404. In turn, this allows the tang 152 to be more strongly bonded to the tang-supporting surface 402 than would be possible had the tang-supporting surface 402 not included or defined such cleating feature or features 404. According to an embodiment of the present invention, the cleating feature or features 404 may define a through bore, as indicated in FIG. 4 by numeral 408. Indeed, the through bore or bores 408 may be configured to enable an adhesive to flow therethrough before the adhesive cures. Such through bore or bores may, therefore, enable the formation of columns or veins of adhesive that act to further strengthen the adhesive bond between the tang 152 and the tang-supporting surface 402. One or more of the through bores 408 may define a through bore axis that is substantially parallel to the pivot axis 182 shown in FIGS. 2 and 3. Alternatively or in addition to the configuration described in the preceding sentence, one or more of the through bores 408 may define a through bore axis that is substantially perpendicular to the pivot axis 182. Alternatively still, one or more of the through bores 408 may define axes that have other orientations. The cleating feature or features 404 may be defined to be continuous or discontinuous on or within the tang-supporting surface 402.

Figure 5:
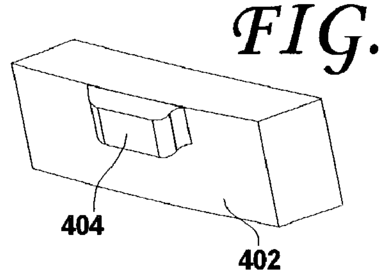
FIG. 5 is a view of a tang-supporting surface of an actuator assembly according to another embodiment of the present invention.
Figure 6:
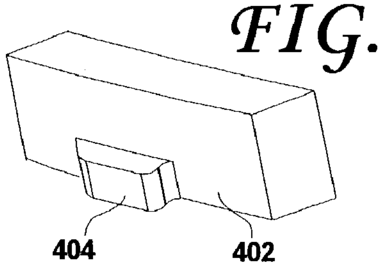
FIG. 6 is a view of a tang-supporting surface of an actuator assembly according to a further embodiment of the present invention.
Figure 7:
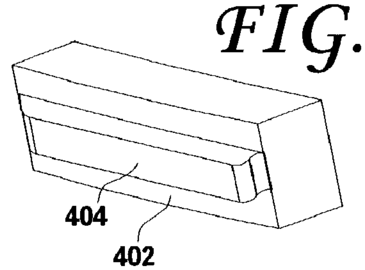
FIG. 7 is a view of a tang-supporting surface of an actuator assembly according to a still further embodiment of the present invention.
Figure 8:
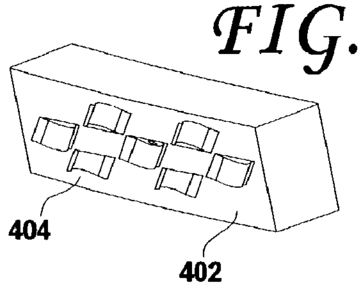
FIG. 8 is a view of a tang-supporting surface of an actuator assembly according to yet another embodiment of the present invention.

FIGS. 5 and 6 show details of tang-supporting surfaces 402 incorporating cleating features 404 according to another embodiment of the present invention. In these embodiments, one edge of the cleating features 404 is aligned with an edge of the tang-supporting surfaces 402. The cleating feature or features 404 may be defined to be discontinuous on or within the tang-supporting surface 402, as shown in FIG. 8. Alternatively still, the cleating feature or features may be continuous, as shown at 404 in FIG. 7. Most any configuration and combination of cleating features 404 may be defined on the tang-supporting surface 402 (and/or on or within the actuator fork member attaching surface 1202 of the tang 152 of FIG. 12). For example, the cleating features 404 may be staggered and may include a combination of extrusions and recesses, as illustrated in FIG. 8. Those of skill in this art will recognize that other configurations of cleating features are possible. For example, the tang-supporting surface 402 may define cleating features that collectively render the tang-supporting surface rough and irregular, further increasing the surface area thereof on which the layer of adhesive 311 may be disposed.

Figure 9:
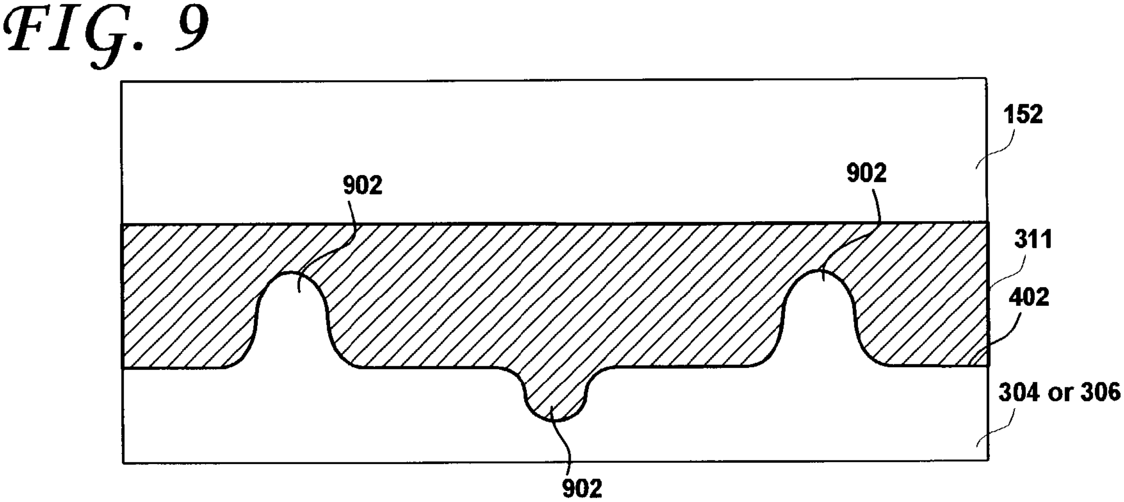
FIG. 9 is a top view of the adhesive interface between the tang-supporting surface and the tang of an actuator assembly according to an embodiment of the present invention.
Figure 10:
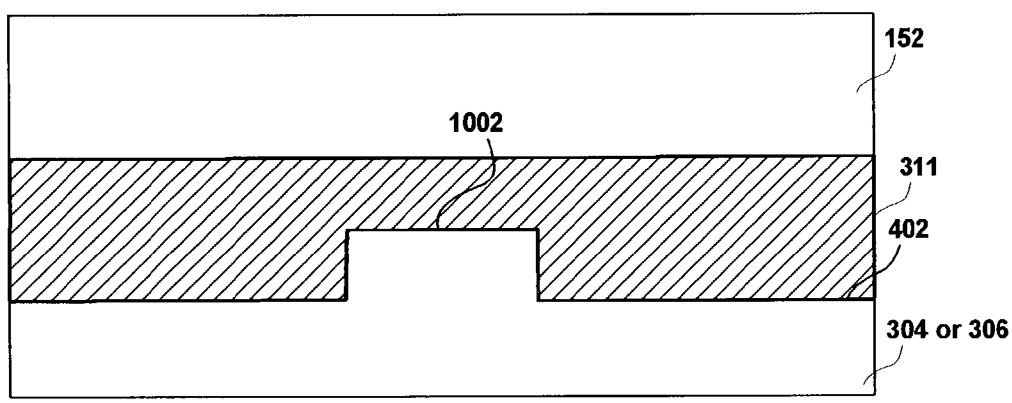
FIG. 10 is a top view of the adhesive interface between the tang-supporting surface and the tang of an actuator assembly according to another embodiment of the present invention.
Figure 11:
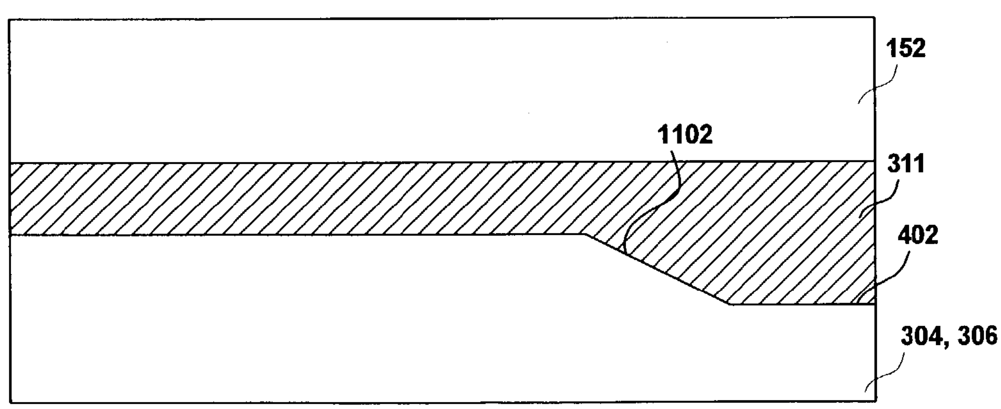
FIG. 11 is a top view of the adhesive interface between the tang-supporting surface and the tang of an actuator assembly according to still another embodiment of the present invention.
Figure 12:
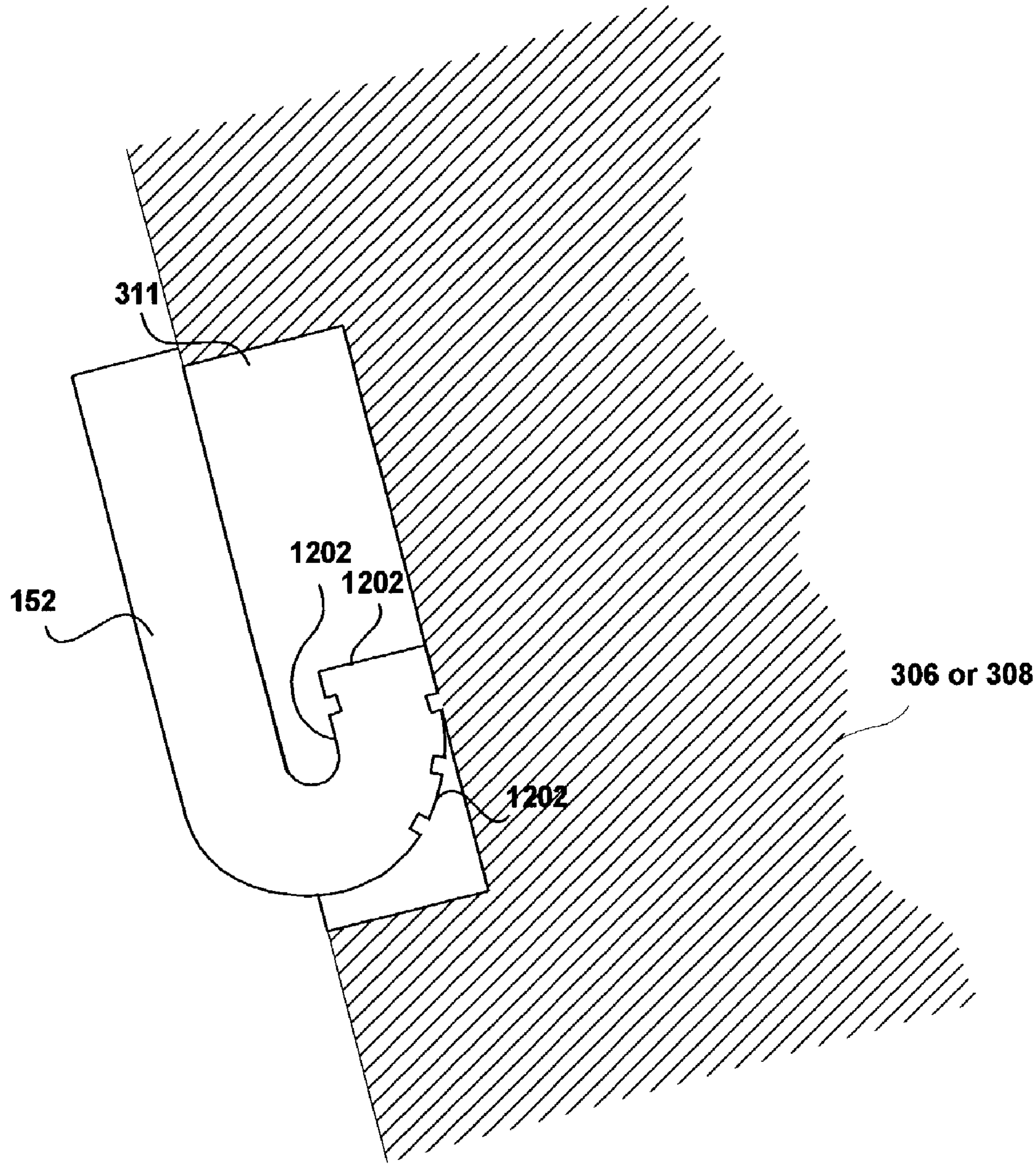
FIG. 12 is a cross sectional view of the interface between the tang, the adhesive layer and one of the actuator fork members, according to another embodiment of the present invention in which the cleating features are defined on the tang.

FIGS. 9–11 show cross-sectional views of exemplary interfaces between the tang-supporting surface 402, the layer of adhesive 311 and the tang 152. The tang-supporting surface 402 may be defined by a portion of one of the actuator fork members 304, 306, as shown in FIG. 3. As shown in FIG. 9, the tang-supporting surface 402 may define cleating features 902 that may extrude or recess from the tang-supporting surface 402. As clearly shown in FIG. 9, the presence of the cleating features 902 increases the surface area of the tang-supporting surface 402. In turn, this increases the surface upon which the adhesive layer 311 may be disposed, thereby strengthening the bond between the tang-supporting surface 402 and the tang 152. The exemplary cleating features 902 of FIG. 9 are rounded, exhibiting smooth transitions between the relatively flatter tang-supporting surface 402 and the cleating features 902. FIG. 10 is another exemplary cross-sectional view of the interface between the tang-supporting surface 402, the layer of adhesive 311 and the tang 152. The exemplary cleating feature 1002 shown therein has a rectangular cross-section. Other cross-sectional shapes are possible, as shown in FIG. 11, in which the cleating feature 1102 is aligned with an edge of the tang-supporting surface 402.

Although the cleating features 404 have been described as being defined by the tang-supporting surface 402, those of skill may recognize that cleating features may be defined on the tang 152 itself, instead of or in addition to the cleating features 404 defined on or by the tang-supporting surface 402. FIG. 12 is a cross sectional view of the interface between the tang, the adhesive layer and one of the actuator fork members, according to another embodiment of the present invention in which the cleating features are defined on the tang. FIG. 12 shows, in cross-section, one of the actuator fork members 306, 308 to which a tang 152 is attached. A layer of adhesive 311 bonds the tang 152 to the actuator fork member 306 or 308. The exemplary tang 152 in FIG. 12 is shown as being shaped like the letter "J", it being understood that this shape is for exemplary and illustrative purposes and that other shapes are possible. Such a tang 152 defines one or more actuator fork member attaching surfaces 1202 that define one or more cleating features. The cleating feature or features on or within the surface(s) 1202 may be configured such as the recesses shown in FIG. 12 and/or may be configured as shown in one or more of the FIGS. 4–11. Such cleating features are configured to increase a surface area of the actuator fork member attaching surface(s) 1202, thereby increasing the surface area exposed to the layer of adhesive 311, which strengthens the bond between the tang 152 and the actuator fork member 306 or 308.

Advantageously, the cleating features on or defined by the tang-supporting surface 402 of one of the actuator fork members 306, 308 or on or defined by the actuator fork member attaching surface 1202 of the tang 152 strengthens the adhesive bond with which the tang 152 is secured to the tang supporting surface 402 of the first or second actuator fork members 304, 306. Those of skill in the art may recognize that modifications of the embodiments disclosed herein are possible. All such modifications are deemed to fall within the purview of the present invention, as defined by the claims.

What is claimed is:

1. A disk drive, comprising:

a disk;

a latch assembly including a magnet;

a head stack assembly for reading and writing to the disk, the head stack assembly comprising:

a body portion defining a through bore that defines a pivot axis;

an actuator arm cantilevered from the body portion;

a head gimbal assembly coupled to the actuator arm;

a coil portion cantilevered from the body portion in an opposite direction from the actuator arm, the coil portion defining first and second actuator fork members, one of the first and second actuator fork members defining a tang-supporting surface, the tang-supporting surface defining at least one cleating feature configured to increase a surface area of the tang-supporting surface, and a tang configured to interact with the magnet, the tang being attached to the tang-supporting surface by a layer of adhesive disposed on the tang-supporting surface.

2. The disk drive of claim 1, wherein the at least one cleating feature defines a cleating feature through bore configured to allow the layer of adhesive to flow therethrough.

3. The disk drive of claim 2, wherein the cleating feature through bore defines a through bore axis that is substantially parallel to the pivot axis.

4. The disk drive of claim 2, wherein the cleating feature through bore defines a through bore axis that is substantially perpendicular to the pivot axis.

5. The disk drive of claim 1, wherein the at least one cleating feature defines a nonzero elevation toward the tang.

6. The disk drive of claim 1, wherein the at least one cleating feature defines a nonzero recess away from the tang.

7. A head stack assembly for reading and writing to a disk of a disk drive, the disk drive including a latch assembly that includes a magnet, the head stack assembly comprising:

a body portion defining a through bore that defines a pivot axis;

an actuator arm cantilevered from the body portion;

a head gimbal assembly coupled to the actuator arm;

a coil portion cantilevered from the body portion in an opposite direction from the actuator arm, the coil portion defining first and second actuator fork members, one of the first and second actuator fork members defining a tang-supporting surface, the tang-supporting surface defining at least one cleating feature configured to increase a surface area of the tang-supporting surface, and a tang configured to interact with the magnet, the tang being attached to the tang-supporting surface by a layer of adhesive disposed on the tang-supporting surface.

8. The head stack assembly of claim 7, wherein the at least one cleating feature defines a cleating feature through bore configured to allow the layer of adhesive to flow therethrough.

9. The head stack assembly of claim 8, wherein the cleating feature through bore defines a through bore axis that is substantially parallel to the pivot axis.

10. The head stack assembly of claim 8, wherein the cleating feature through bore defines a through bore axis that is substantially perpendicular to the pivot axis.

11. The head stack assembly of claim 7, wherein the at least one cleating feature defines a nonzero elevation toward the tang.

12. The head stack assembly of claim 7, wherein the at least one cleating feature defines a nonzero recess away from the tang.

13. An actuator assembly for a disk drive, the disk drive having a latch assembly that includes a magnet, the actuator assembly comprising:

a body portion defining a through bore that defines a pivot axis;

an actuator arm cantilevered from the body portion;

a coil portion cantilevered from the body portion in an opposite direction from the actuator arm, the coil portion defining first and second actuator fork members, one of the first and second actuator fork members defining a tang-supporting surface, the tang-supporting surface defining at least one cleating feature configured to increase a surface area of the tang-supporting surface, and a tang configured to interact with the magnet, the tang being attached to the tang-supporting surface by a layer of adhesive disposed on the tang-supporting surface.

14. The actuator assembly of claim 13, wherein the at least one cleating feature defines a cleating feature through bore configured to allow the layer of adhesive to flow therethrough.

15. The actuator assembly of claim 14, wherein the cleating feature through bore defines a through bore axis that is substantially parallel to the pivot axis.

16. The actuator assembly of claim 14, wherein the cleating feature through bore defines a through bore axis that is substantially perpendicular to the pivot axis.

17. The actuator assembly of claim 13, wherein the at least one cleating feature defines a nonzero elevation toward the tang.

18. The actuator assembly of claim 13, wherein the at least one cleating feature defines a nonzero recess away from the tang.

19. An actuator assembly for a disk drive, the disk drive having a latch assembly that includes a magnet, the actuator assembly comprising:

a body portion defining a through bore that defines a pivot axis;

an actuator arm cantilevered from the body portion;

a coil portion cantilevered from the body portion in an opposite direction from the actuator arm, the coil portion defining first and second actuator fork members, one of the first and second actuator fork members defining a tang-supporting surface, and a tang configured to interact with the magnet, the tang defining an actuator fork member attaching surface, the actuator fork member attaching surface defining at least one cleating feature configured to increase a surface area of the actuator fork member attaching surface, the actuator fork member attaching surface being attached to the tang-supporting surface by a layer of adhesive.

20. The actuator assembly of claim 19, wherein the at least one cleating feature cleating feature defines a through bore configured to allow the layer of adhesive to flow therethrough.

21. The actuator assembly of claim 20, wherein the through bore defines a cleating feature through bore axis that is substantially parallel to the pivot axis.

22. The actuator assembly of claim 20, wherein the through bore defines a cleating feature through bore axis that is substantially perpendicular to the pivot axis.

23. The actuator assembly of claim 19, wherein the at least one cleating feature defines a local extrusion.

24. The actuator assembly of claim 19, wherein the at least one cleating feature defines a local recess.

* * * * *